United States Patent

Takegahara et al.

Patent Number: 6,100,493
Date of Patent: Aug. 8, 2000

[54] METHOD OF FORMING NC DATA FOR CORELESS MACHINING IN WIRE ELECTRIC DISCHARGE MACHINING

[75] Inventors: Takashi Takegahara, Hachioji; Shigetoshi Takagi; Koji Suzuki, both of Oshino-mura, all of Japan

[73] Assignee: Fanuc Ltd, Yamanashi, Japan

[21] Appl. No.: 09/155,864

[22] PCT Filed: Feb. 9, 1998

[86] PCT No.: PCT/JP98/00527

§ 371 Date: Oct. 7, 1998

§ 102(e) Date: Oct. 7, 1998

[87] PCT Pub. No.: WO98/35274

PCT Pub. Date: Aug. 13, 1998

[30] Foreign Application Priority Data

Feb. 7, 1997 [JP] Japan ...................................... 9-38578

[51] Int. Cl.$^7$ ................................................... B23H 7/02
[52] U.S. Cl. ........................................ 219/69.12; 700/162
[58] Field of Search .............................. 219/69.12, 69.17; 700/162

[56] References Cited

U.S. PATENT DOCUMENTS 5,113,050   5/1992   Seki et al. ............................ 219/69.12

FOREIGN PATENT DOCUMENTS

| 0 692 333 | 1/1996 | European Pat. Off. . |
| 8-25145 | 1/1996 | Japan . |
| 8-99226 | 4/1996 | Japan . |

*Primary Examiner*—Geoffrey S. Evans
*Attorney, Agent, or Firm*—Staas & Halsey, LLP

[57] ABSTRACT

A cutting shape (Q1) is approximated to a polygonal shape (Q3). Division points are obtained by dividing line segments linking each vertex of this polygonal shape (Q3) with the cutting start point (PS1) by the same number. Corresponding division points on each line segment are then linked to obtained a plurality of polygonal closed paths (PH2–PH4). Here, the innermost closed path (PH2) is devised such that at least a portion thereof passes outside the cutting starting hole centered on the cutting start point (PS1).

2 Claims, 8 Drawing Sheets

METHOD OF FORMING NC DATA FOR CORELESS MACHINING IN WIRE ELECTRIC DISCHARGE MACHINING

BACKGROUND OF THE INVENTION

1. Field of the Invention

The present invention relates to a method for creating NC data for the path of movement of a wire electrode, when performing cutting processing by means of wire cut discharge processing.

2. Description of the Related Art

When performing cutting processing by means of wire cut discharge processing, in particular, in cases where the core forming the cutting shape is relatively small, or the like, it is difficult to hold a core which has undergone cutting processing on the work by means of a jig comprising magnets or suction devices, and consequently the core sometimes becomes detached during processing, and parts of the wire or discharge processing device may be damaged by impact of the core when it falls.

Therefore, in order to prevent incidents of this kind in advance, so-called coreless processing, wherein wire discharge processing is conducted along the whole core and the core is completely melted, has been disclosed in Laid-Open Japanese Unexamined Patent Application No. 3-111124, and the like.

This commonly known coreless processing NC data creates a relative path of travel of a wire electrode with respect to a work, the path having a similar shape to the outline of the coreless processing region which expands successively from the centre of the coreless processing region, such that the whole of the cutting shape core region corresponding to cutout shape of the work is removed by wire cut discharge processing.

Conventionally, NC data for coreless processing as described above is created without regard to the size of the cutting start hole for wire cut discharge processing. Therefore, if the processing path moves inside this cutting start hole, the wire electrode will perform a purposeless movement relative to the work, without carrying out processing of any kind. Furthermore, processing time will also be lengthened.

SUMMARY OF THE INVENTION

The object of the present invention is to provide a method for creating NC data for coreless processing in wire cut discharge processing, wherein the size of the cutting start hole is taken into consideration and purposeless processing paths which do not contribute to processing are reduced.

In order to achieve the aforementioned object, in the method for creating NC data for coreless processing according to the present invention, wherein wire cut discharge processing is carried out by successively expanding the closed path of a wire starting from a cutting start point within a cutting shape, such that the whole of a specified cutting shape region can be processed by wire cut discharge, closed paths which pass only on the inner side of the cutting start hole are omitted, NC data is created for movement from the cutting start point and to a closed wire path, at least a portion of which passes through the processing region outside the cutting start hole, and subsequently NC data is created for closed wire paths which are successively expanded from the aforementioned closed wire path.

Since the present invention is devised such that NC data is only created for wire paths wherein a portion of the wire path passes through the region outside the cutting start hole, and no NC data is created for closed wire paths contained within the processing start region, then when processing by means of the aforementioned NC data, coreless processing can be carried out by implementing discharge processing starting from the region where discharge processing is required, without implementing purposeless movements of the wire cut discharge device, and therefore efficiency is good and processing time can be shortened.

DESCRIPTION OF THE PREFERRED EMBODIMENTS

Figure 1:
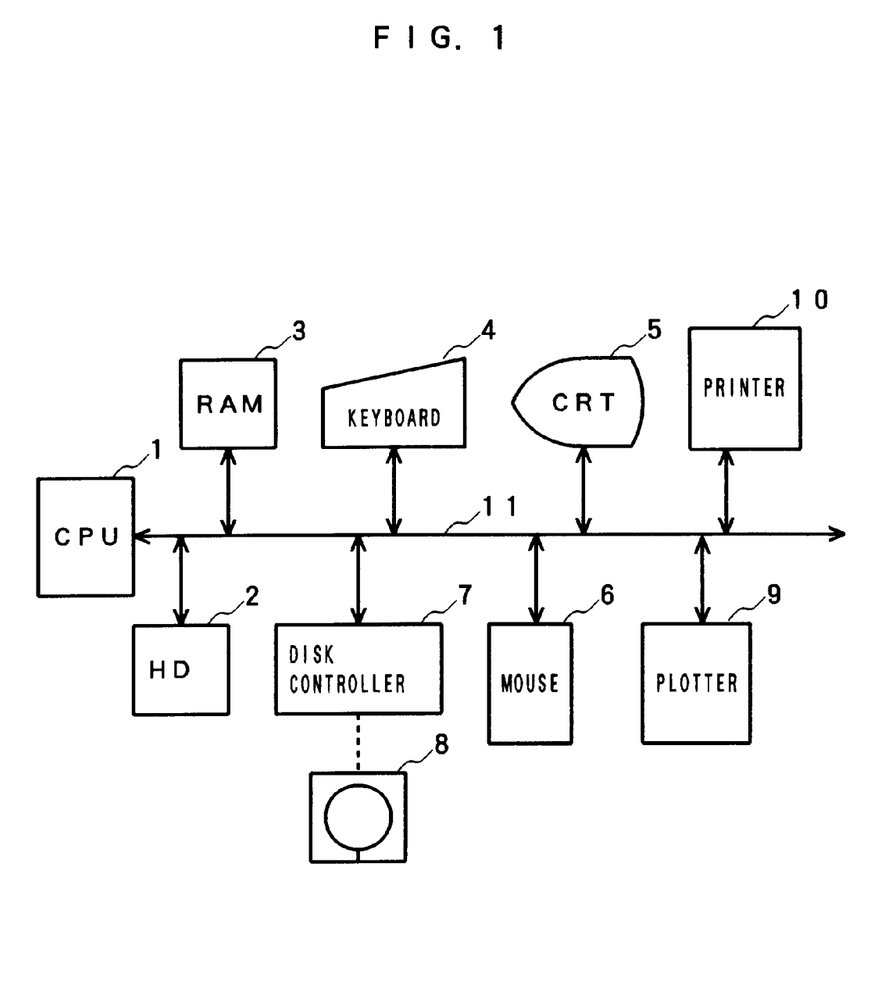
FIG. 1 is a block diagram of main components of an automatic programming device for implementing the method according to the present invention.

One example of an automatic programming device in the form of a CAD/CAM system for implementing the method according to the present invention is illustrated referring to a block diagram of principal components of the device in FIG. 1.

In FIG. 1, numeral 1 is a processor (hereinafter referred to as CPU), 2 is a hard disk whereon programs for controlling the automatic programming device are stored, 3 is a RAM for recording various types of data, including system programs and NC data, 4 is a keyboard, 5 is a graphic display, such as a CRT or liquid crystal display, 6 is a mouse, 7 is a disk controller, and 8 is a floppy disk forming an external recording device, which stores system programs of various kinds. 9 is a plotter for outputting prepared drawings, and 10 is a printer. These respective principal elements are connected with a bus 11.

The mouse 6 enables various items and figures to be selected by picking out menu items or figures shown on the display screen of the graphic display 5.

On the floppy disk 8, in addition to conventional CAD/CAM system programs for designing shapes by using the mouse 6 and keyboard 4, and automatically creating and successively storing NC data for each designed shape, there is also stored a program relating to a method for creating coreless NC data in wire cut discharge processing according to the present invention.

This automatic programming device is similar to conventional machines, and the operation of designing processing shapes by using this automatic programming machine is also similar to conventional methods. In other words, CAD/CAM system programs stored on a floppy disk 8 are read into a system program storage region of the RAM 3 by means of the disk controller 7, and a desired shape is designed by means of an interactive format on the display screen of the graphic display 5 by operating the mouse 6 and keyboard 4, in accordance with instructions, namely, messages shown on the display screen of the graphic display 5, these messages or instructions being from the CPU 1, which is driven according to the aforementioned CAD/CAM system program.

Thereupon, after the CAD/CAM system program and the coreless NC data program for wire cut discharge processing have been stored in the RAM 3, an outline shape for coreless processing created as described above, or an outline shape for coreless processing previously created and stored on a floppy disk 8, or the like, is read out and recorded in the RAM 2. If key data for coreless processing is set in the form of a wire diameter DW used in the wire cut discharge processing machine for coreless processing, a diameter DH of a pilot hole H previously formed (or to be formed) in the work for the purpose of coreless processing, a finishing allowance T, and a cutting start point (coordinate position) PS1, which is the centre point of the aforementioned pilot hole H, then when a coreless processing NC data creation command is input, the processor 1 will start the processing shown in the flowcharts in FIGS. 2–4.

Figure 2:
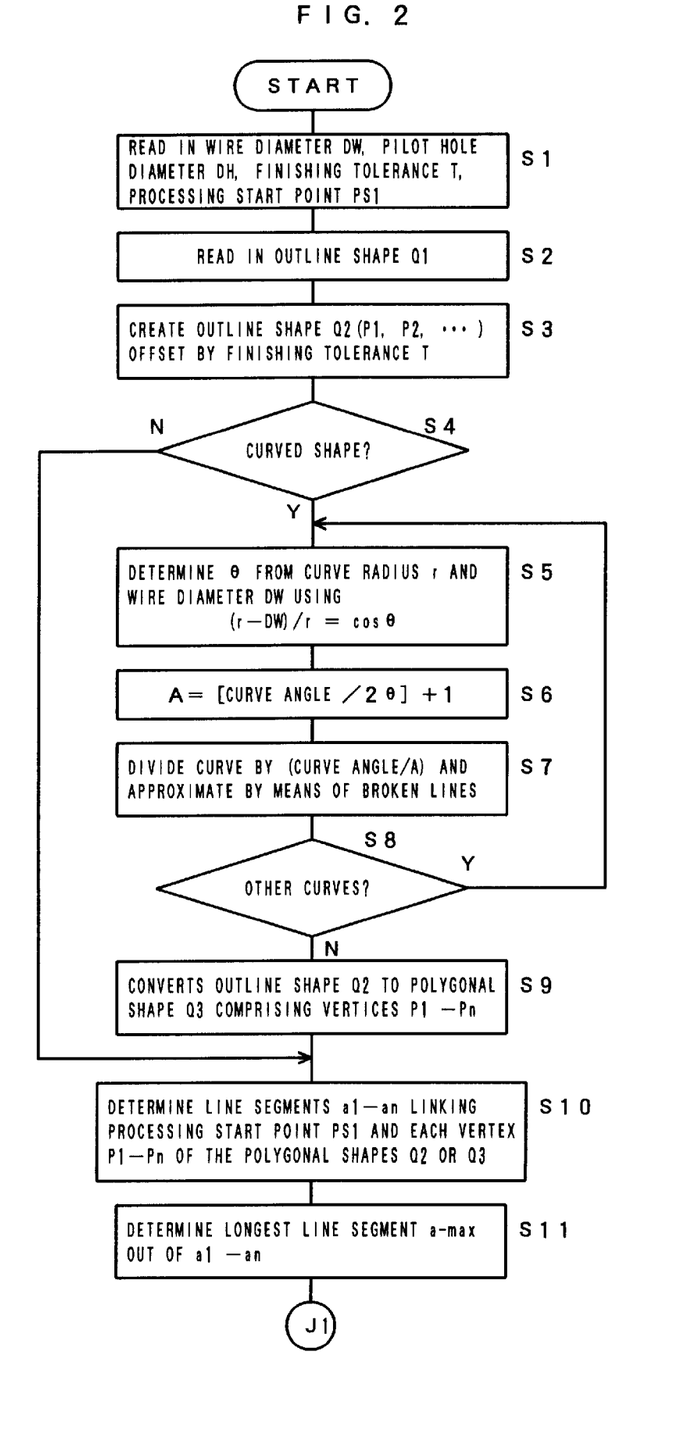
FIGS. 2–4 are flowcharts illustrating processing sequences according to one mode of the present invention as implemented by the processor in the automatic programming device in FIG. 1.
Figure 3:
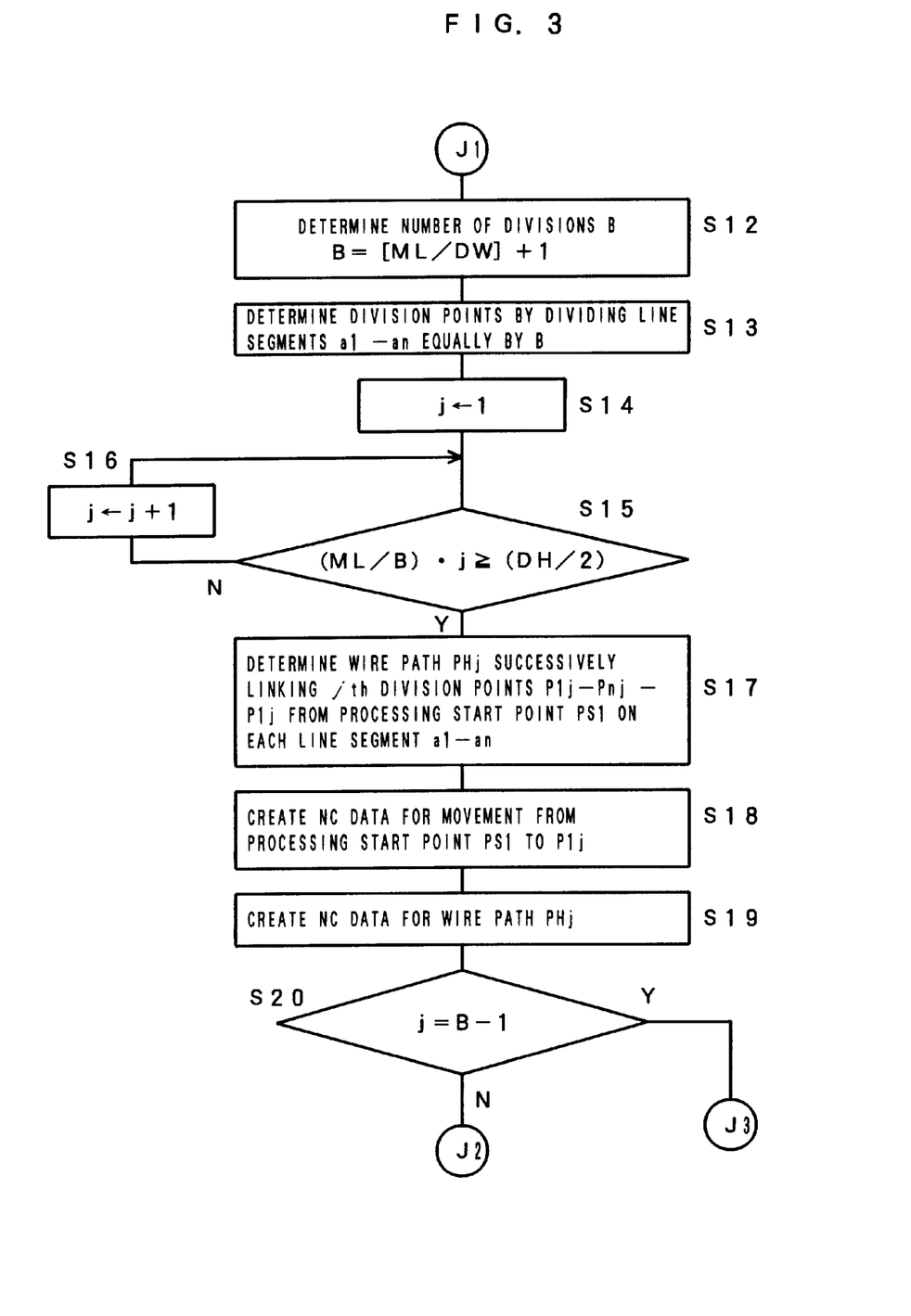
Figure 4:
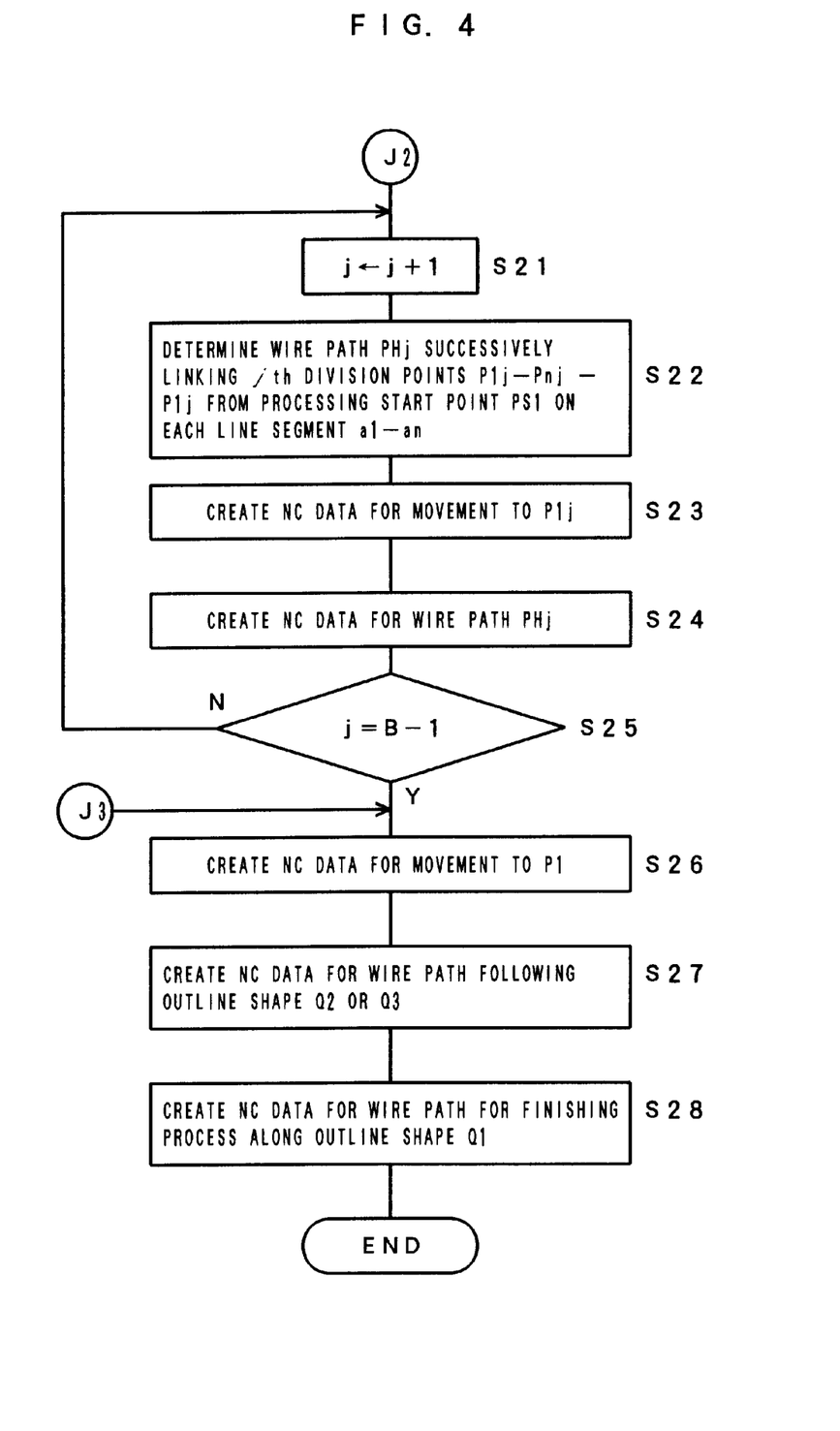

Here, a method for creating NC data for coreless processing is described with reference to the flowcharts in FIGS. 2–4, taking as an example a case where the outline shape Q1 of the coreless processing region has the shape depicted in FIG. 5.

Figure 5:
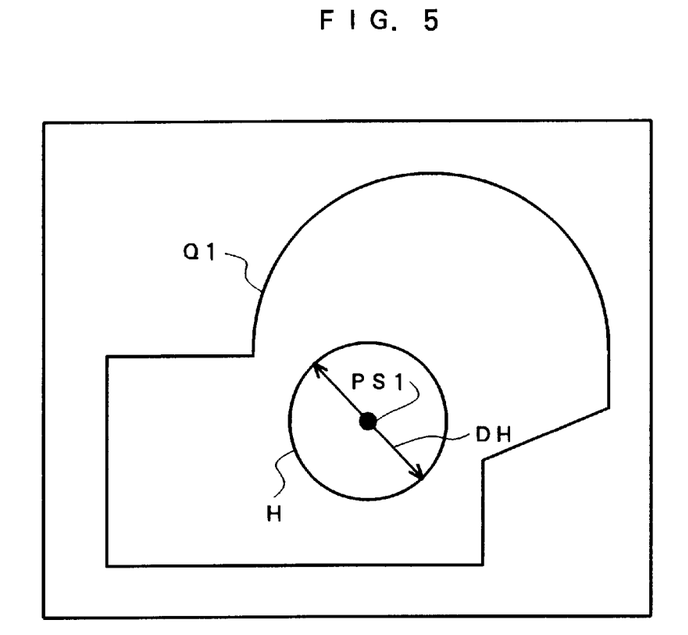
FIG. 5 is a diagram illustrating an outline of a coreless processing region and a cutting start hole.
Figure 6:
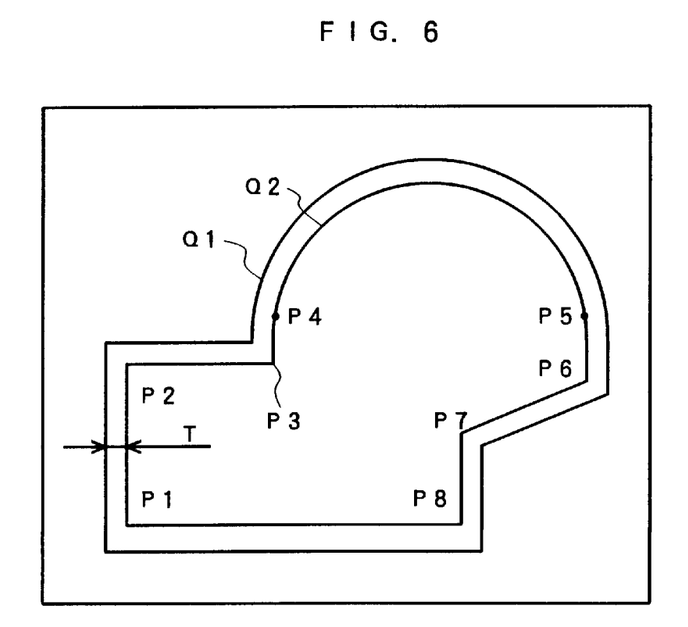
FIG. 6 is a diagram illustrating a step of creating an outline shape which is offset from the outline shape in FIG. 5 towards the cutting start hole by an amount corresponding to a finishing allowance.

As shown in FIG. 5, a pilot hole H having a diameter DH and a centre point at the cutting start point PS1 is formed in the work. First, the set wire diameter DW, pilot hole diameter DH, finishing allowance T and cutting start point PS1 are read out, along with the outline shape Q1 (step S1, S2). Thereupon, an outline shape Q2 offset by an amount corresponding to the finishing allowance T towards the pilot hole H is created (step S3). The outline shape Q2 in the present example is as shown in FIG. 6. Next, it is determined whether there are any arcs in the outline shape (step S4), and if there are no arcs, the sequence proceeds to step S10, whilst if there are arcs, these arcs are approximated by means of broken lines.

In this case, the maximum error ε between the arc and broken line (see FIG. 8) is set such that it is less than the wire diameter DW. According to FIG. 8, the maximum interval between an arc of radius r and angle 2θ and the broken lines corresponding to that arc, in other words, the maximum error, ε, can be derived by $$\epsilon = r - r \cos \theta.$$

Figure 8:
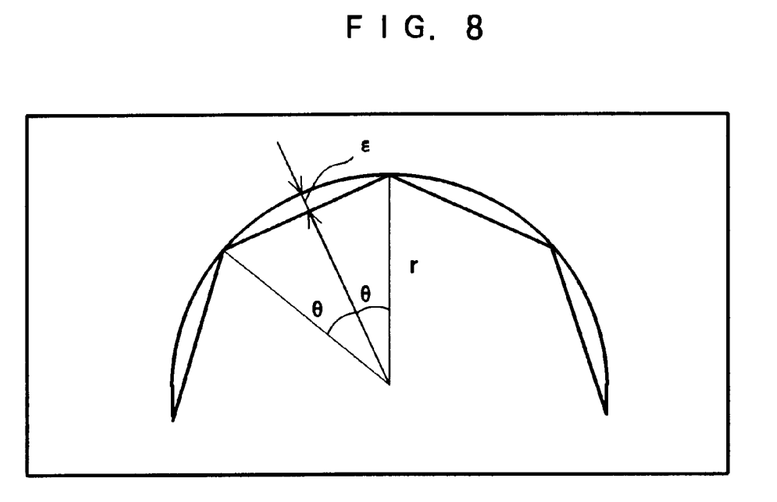
FIG. 8 is a diagram illustrating a step of dividing an arc when an arc is approximated by means of a broken line.

Here, if the maximum error, ε, is set equal to the wire diameter (ε=DW), then the foregoing equation becomes $$r - r \cos \theta = DW.$$

Therefore, $$\cos \theta = (r - DW)/r \qquad (1).$$

The angle θ is then derived by solving equation (1) using the arc radius r and the wire diameter DW (step S5), the arc angle α is divided by 2θ, figures after the decimal point are discarded from the resulting value and "1" is added thereto, to yield a number of divisions A (step S6). The arc angle α is then divided into A angles of equal size, a division point is determined on the arc for each division of the arc angle (α/A), the final point being set as an arc end point, and the arc is approximated to a broken line by linking the arc start point, division points and arc end point by means of a broken line (step S7).

Figure 7:
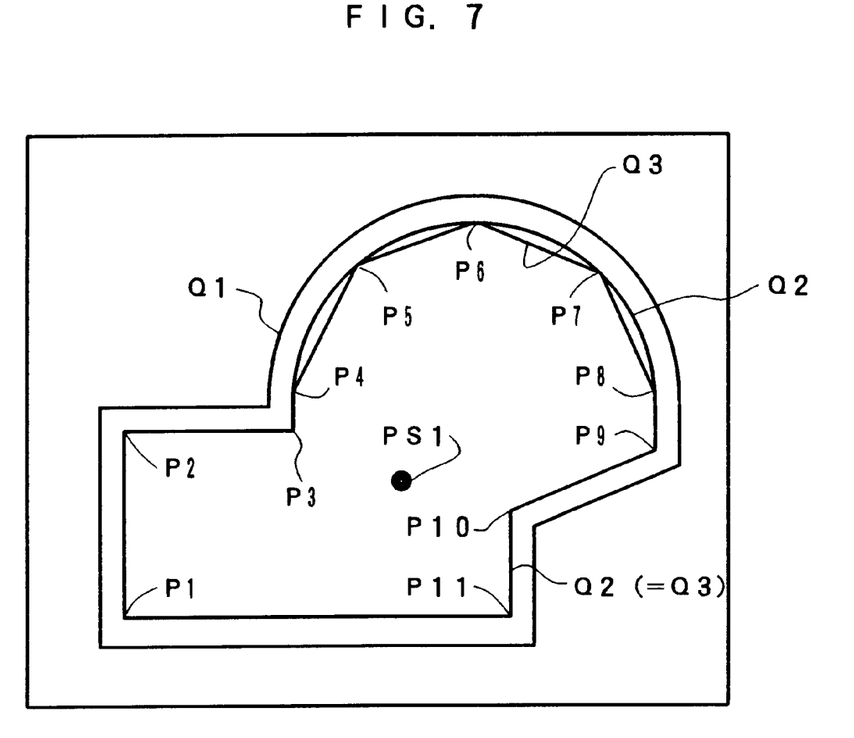
FIG. 7 is a diagram illustrating a step of taking the whole outline shape as a polygonal shape by approximating arc portions of the offset outline shape in FIG. 6 by means of broken lines.

It is then determined whether there are any further arcs (step S8), and if there is a further arc, the processing from step S5 onwards is implemented and this arc is approximated by a broken line (see FIG. 7). When all the arcs have been approximated by broken lines, the data for the outline shape Q2 containing arcs is converted to data for a polygonal shape Q3. In this case, the polygonal shape Q3 is obtained in the form of vertices starting from the arc start point and successively linking the division points until the end point. In the present example, the outline shape Q2 links points P1, P2, P3, P4 successively by means of straight lines, as shown in FIG. 6, point P4 to point P5 is linked by an arc, and points P5, P6, P7, P8, P1 are linked respectively by straight lines. Therefore, the aforementioned arc portion between P4 and P5 is approximated by means of broken lines as shown in FIG. 7, and if this portion is divided equally into 4 portions to give 3 division points, as in the present example, then the vertices P5, P6, P7 are obtained in succession starting from the division point following the arc start point P4, the point P5 in FIG. 6 which is the end point of the arc is changed to vertex P8, as shown in FIG. 7, and the following points are changed successively, thus converting the points to a polygonal shape Q3 comprising data for vertices P1–P11, as shown in FIG. 7 (step S9).

Figure 9:
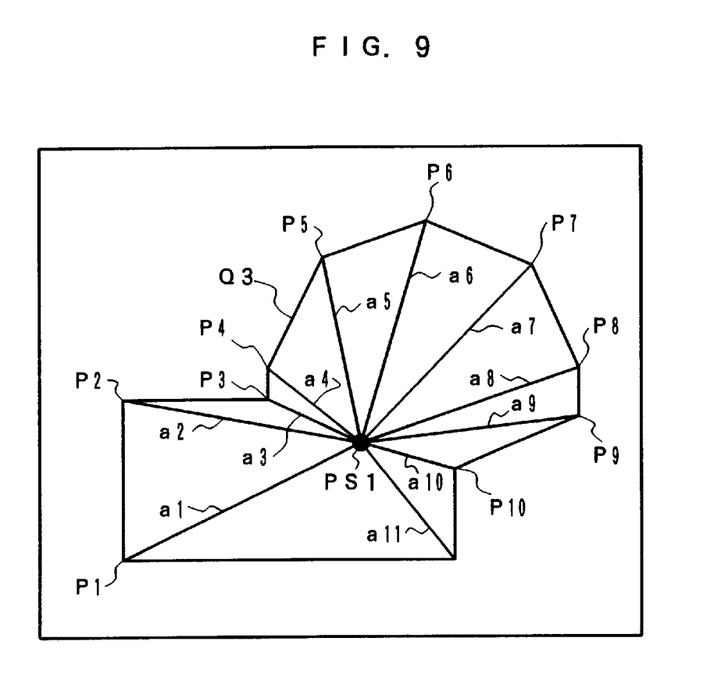
FIG. 9 is a diagram illustrating a step of linking a cutting start point and each vertex of the polygonal shape in FIG. 7, respectively, by means of straight lines.
Figure 10:
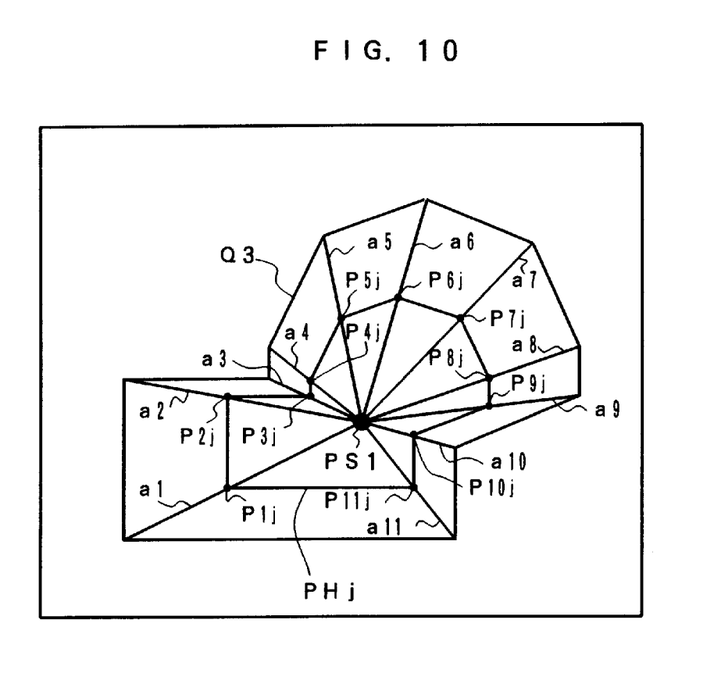
FIG. 10 is a diagram illustrating a step of setting division points whereby the respective straight lines in FIG. 9 are divided by the same number, and obtaining a polygonal closed path by linking corresponding division points of each straight line.

Thereupon, line segments a1–an are derived linking each of the vertices P1–Pn of the aforementioned polygonal shape Q3 (in FIG. 7, n=11) with the cutting start point PS1 (step S10) (see FIG. 9). The longest of these line segments a1–an (longest segment: a-max) is then derived (step S11), the length ML of this longest line segment a-max is divided by the wire diameter DW, figures after the decimal point are discarded from the resulting value, and "1" is added thereto, to give a number of divisions B into which the line segments are to be divided (step S12).

The line segments a1–an are each divided equally by the division number B to yield respective division points a11–a1(B−1), a21–a2(B−1), . . . , an1–an(B−1) (step s13). Next, taking the index j as "1" (step S14), the value obtained by dividing the length ML of the aforementioned longest line segment a-max by the number of divisions B is multiplied by the value of the aforementioned index j, and it is determined whether the resulting value is greater than ½ of the pilot hole diameter DH (step S15). If it is not greater than (½), then the index j is incremented by "1" (step S16), and the processing in step S15 is repeated, to determine the value of the index j at which the aforementioned value becomes greater than ½ of the pilot hole diameter DH. In other words, in the operations in step S15 and S16, it is determined whether or not a wire path formed by linking together similarly numbered division points of the line segments a1–an from the cutting start point PS1 will be contained within the pilot hole H.

If the distance from the cutting start point PS1 to the division point on the longest line segment a-max is less than the radius (DH/2) of the pilot hole H, then the wire path passing through this division point of the longest line segment a-max will be contained in the region of the pilot hole H. Therefore, the corresponding division points on the other line segments apart from (and shorter than) the longest line segment a-max are naturally also contained within the region of the pilot hole. On the other hand, if the distance from the cutting start point PS1 to the division point on the longest line segment a-max is greater than the radius of the pilot hole H, then this means that a wire path passing through this division point on the longest line segment a-max will pass outside the region of the pilot hole H, and the corresponding division points on the other line segments may either lie inside the region of the pilot hole H, or they may lie outside the region of thereof.

For example, if j=2 and (ML/B)·2<(DH/2), then the second division point on the longest line segment a-max from the cutting start point PS1 will lie inside the pilot hole. Therefore, the distances from the cutting start point PS1 to the second division points on the other line segments will also be less than the radius (DH/2) of the pilot hole H, so all of these second division points will lie inside the region of the pilot hole H. Furthermore, if j=3 and (ML/B)·3≧(DH/2), then this means that the third division point on the longest line segment a-max does not lie inside the region of the pilot hole H (here, the third division points on the line segments other than the longest line segment a-max may lie outside the region of the pilot hole H or inside the region thereof)

When the value of the index j has been determined by the operation in step S15, a wire path PHj is determined by successively linking the jth division points P1j–Pnj–P1j of each line segment a1–an from the cutting start point PS1 (step S17). This wire path PHj passes outside the region of the pilot hole H in at least one portion thereof. Thereupon, NC data is created for movement from the cutting start point PS1 to the jth division point P1j, from the side of cutting start point PSI, corresponding to the first vertex P1, and this data is stored in a prescribed region of the RAM 3 (step S18).

Thereupon, NC data is created for the wire path PHj determined in step S17, and this is stored consecutively in the prescribed region of the RAM 3 (step S19).

Thereupon, it is determined whether or not the index j has reached a value of the division number B minus 1 (step 20). In other words, it is determined whether or not the index has reached the number of division points on each line segment, and if it has reached the number of division points and it has not been possible to create a wire path linking the division points, then the sequence moves to step S26. Furthermore, if j=B–1 does not hold, but there is a path linking the division points, then "1" is added to the index j (step S21), and similarly to step S17, a closed wire path PHj is determined successively linking the jth division points P1j–Pnj–P1j from the cutting start point PS1 on each line segment a1–an (step S22), and NC data is created for movement from the end point (start point) P1(j–1) of the wire path linking the previous set of division points to point P1j which is the start point of the current wire path PHj, and this data is stored in the RAM 3 (step S23). NC data is also created for the wire path PHj determined in step S22 and this is stored consecutively in the RAM 3 (step S24).

Thereupon, it is determined whether or not the value of the index j has reached a value of the division number B minus 1, in other words, whether the index has reached the number of the division points on each line segment and all the wire paths linking the division points have been created. If j=B–1 does not hold, and all the wire paths linking division points have not been created, the processing from step S21 onwards is repeated, and NC data is created for a wire path PHj linking division points j on each line segment a1–an, along with NC data for movement linking the wire paths PHj from the division point P1(j–1) to division point P1j, and this data is stored in the RAM 3.

When j=B–1, and NC data has been obtained for the wire paths PH linking the division points of each line segment a1–an, and the like, NC data is created for movement to the initial vertex P1 of the polygonal outline shape Q3 and stored in the RAM 3, whilst NC data following the outline shape Q3 (in FIG. 7, P1–P11–P1) is also created and stored in the RAM 3 (steps S26, S27). Finally, NC data for finishing processing following the outline shape Q1 is created and this data is also stored in the RAM 3 (step S28), whereupon the NC data creating process ends.

Figure 11:
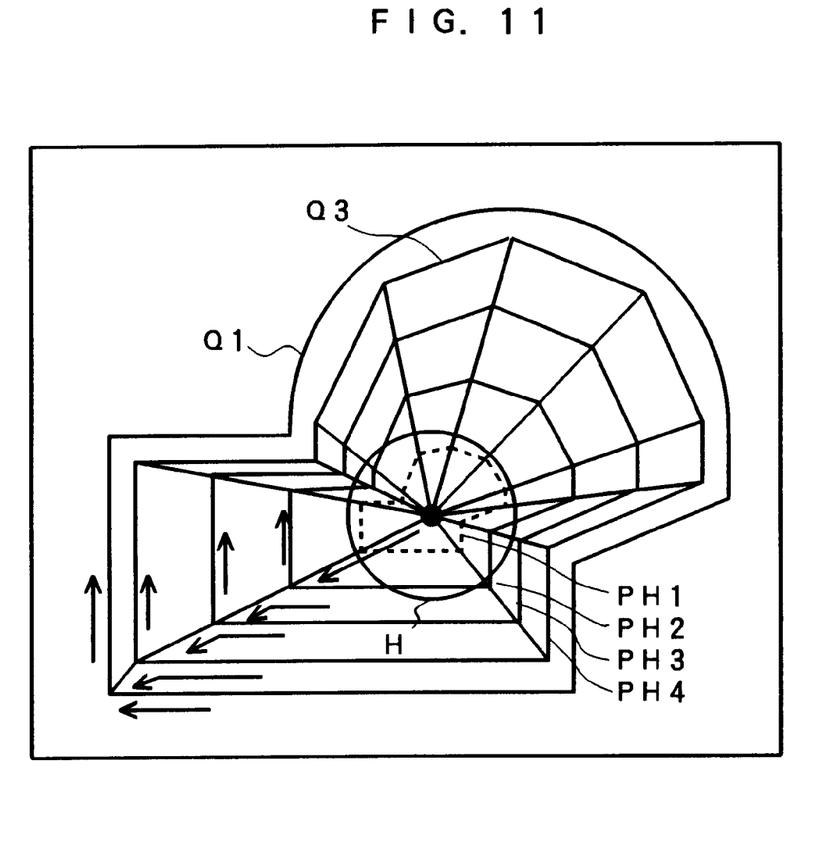
FIG. 11 is a diagram illustrating a wire path in a case where cutting processing is conducted by discharge processing along a plurality of polygonal closed paths including the closed path in FIG. 10.

As shown in FIG. 11, in this way, closed paths which pass only on the inner side of the cutting start hole are omitted, and NC data for a closed wire path which can gradually be expanded is obtained.

The foregoing mode of implementation related to a method for creating NC data for cutting a polygonal outline shape, or a polygonal outline shape containing arcs in a portion thereof, is processed, but if the outline of this cutting shape is circular, then it is also possible to determine the number of divisions for dividing the radius of the circle from this radius and the wire diameter DW, in a manner similar to that of step S12, divide the radius into this number of divisions, determine a closed path (circle) taking each division point as a radius, and to create NC data for a closed (circular) wire path starting from the cutting start point and having a radius greater than the radius of the cutting starting hole centred on the cutting start point, as well as successively creating NC data for movement from closed paths comprising division points at a smaller radius to closed paths linking division points at a larger radius.

What is claimed is:

1. A method for creating NC data for coreless processing in wire cut discharge processing, in which wire cut discharge processing is carried out by gradually expanding a closed wire path starting from a cutting start point within a cutting shape, in order that the whole of a specified cutting shape region is processed by wire cut discharge, wherein closed wire paths which pass only through the inner side of a cutting starting hole are omitted from the wire paths, NC data is created for movement from the cutting start point to a closed wire path wherein at least a portion of the wire path passes through a processing region outside the cutting starting hole, and NC data is subsequently created for closed wire paths which expand successively from said closed wire path.

2. A method for creating NC data for a movement path of a wire electrode in wire cut discharge processing, comprising:

a first polygonal closed path containing a cutting start point;

a second closed path created by maintaining an interval less than the diameter of the wire electrode used in wire cut discharge processing from said first closed path to the outer side thereof;

a third closed path created by maintaining an interval less than the diameter of said wire electrode from said second closed path to the other side thereof; and a (J+1)th closed path created by maintaining an interval less than the diameter of said wire electrode from a Jth closed path to the outer side thereof (where j is any integer above 1), wherein said innermost first path is created such that at least a portion thereof passes outside a cutting starting hole centered on the aforementioned cutting start point, within a range that does not exceed the diameter of said wire electrode from the edge of said processing hole.

* * * * *

UNITED STATES PATENT AND TRADEMARK OFFICE
CERTIFICATE OF CORRECTION

PATENT NO.:     6,100,493
DATED      :    August 8, 2000
INVENTOR(S):    Takegahara et al.

It is certified that an error appears in the above-identified patent and that said Letters Patent is hereby corrected as shown below:

Column 6,
    line 56, change "other" to --outer--.

Signed and Sealed this

Fifteenth Day of May, 2001

Attest:

NICHOLAS P. GODICI

Attesting Officer     Acting Director of the United States Patent and Trademark Office